July 26, 1960

TAKAO YAMAGUCHI 2,946,224

DYNAMIC BALANCING APPARATUS

Filed Sept. 17, 1956

INVENTOR
TAKIO YAMAGUCHI

BY *James M. Drysdale*

ATTORNEY

July 26, 1960  TAKAO YAMAGUCHI  2,946,224
DYNAMIC BALANCING APPARATUS
Filed Sept. 17, 1956  2 Sheets-Sheet 2
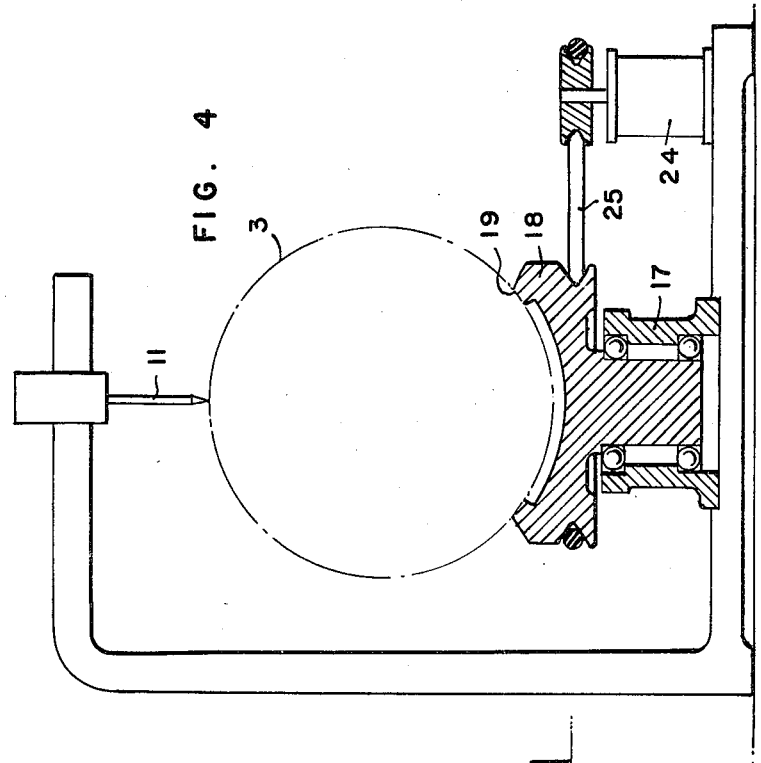
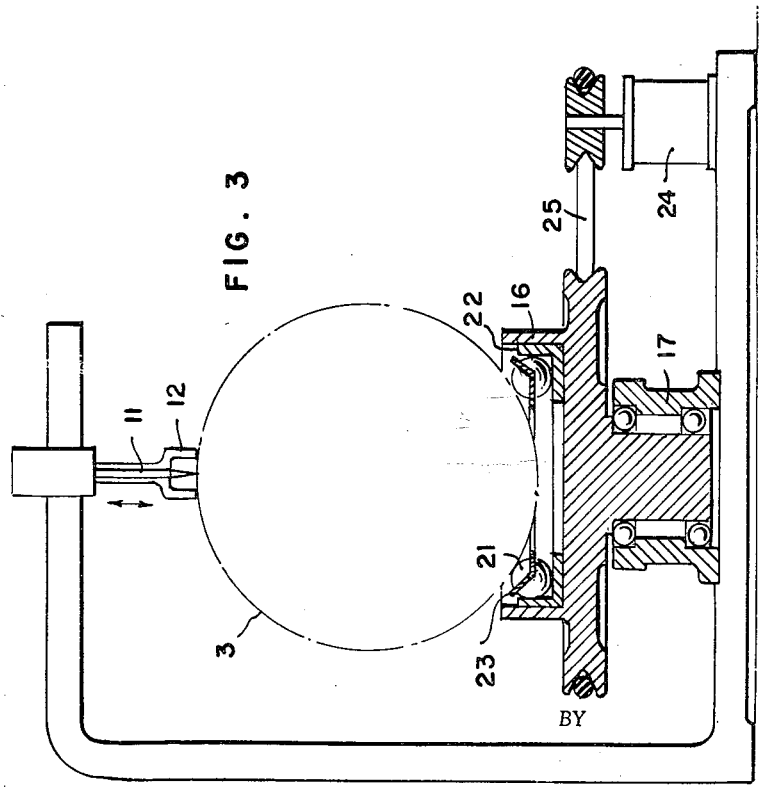
INVENTOR
T. YAMAGUCHI
BY
James M. Drysdale
ATTORNEY

United States Patent Office 2,946,224
Patented July 26, 1960

2,946,224

DYNAMIC BALANCING APPARATUS

Takao Yamaguchi, 446 Asahi-cho, Nerima-ku, Tokyo, Japan

Filed Sept. 17, 1956, Ser. No. 610,217

2 Claims. (Cl. 73—461)

In a generally known prior dynamic balancing apparatus for a rotating body, the magnitude and phase of the dynamic unbalance quantity of the body are measured, and from the result of this measurement, the unbalance quantity is deleted. Therefore, considerable time is required both for measuring and for deletion of the unbalance quantity. Moreover, since the balancing cannot be accomplished in general by only one cycle of such operation, several repeated cycles are inevitably used so that the unbalance quantity may gradually approach to zero, which is a so-called cut and try method.

The dynamic balancing apparatus of the present invention makes it possible, without requiring any such operation of measuring unbalance quantity, to obtain the central axis of equilibrium by a single operation within a short time, and is very simple in operation, wherein, if necessary, a complete balancing work can be attained by a single operation taking this obtained axis as a center line.

In general, a so-called dynamic balancing is, speaking briefly, to make the rotation axis of a rotary body to coincide with the main axis of moment of inertia passing through its center of gravity, namely, the main axis of inertia. Therefore, in order to obtain a dynamic balance, it is first necessary to obtain a static balance. A static balance may be obtained by regulating the rotation of a rotary body so that the rotation axis passes through the center of gravity of the body. Therefore, if the rotation axis of the rotary body is made to coincide with its main axis of inertia, then it results that the dynamic balance has been obtained. When a rotary body is in this condition, no oscillation will be induced even if it is rotated at a high speed.

Other objects and advantages will be more particularly pointed out hereinafter or will become apparent as the description proceeds.

It is a further object of the invention to provide an apparatus of this nature which is simple and easy to read, understand and operate, so that the same may be employed successfully by relatively inexperienced as well as experienced operators.

For a further understanding of the invention reference is to be had to the following description and the accompanying drawings, wherein:

Fig. 3 shows, partly in section, a modified form of the invention.

Fig. 4 shows, partly in section, another modified form of the invention.

Figure 1:
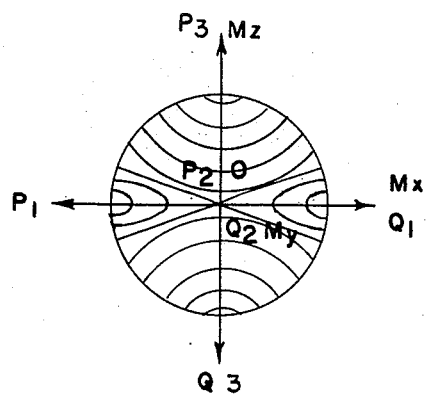
Fig. 1 is a graphical figure serving for explaining the present invention.

Now, for convenience of explanation, assume a spherical body, the center of gravity of which is assumed to coincide with the center of sphere. This spherical body is supported on a cup-like bearing surface having the same radius as that of the sphere, and the body is permitted to rotate about any line passing through the center of the sphere. In this condition, assume that a rotation torque is applied externally to the spherical body and that the body is caused to rotate initially with its main axis of inertia deviated from the central axis of rotation. In this case, despite of the fact that the rotation axis of the spherical body is a line fixed with respect to the space, it is not always fixed with respect to the spherical body. This fact may be observed in practice when a marking is impressed continuously on the external surface of the rotating spherical body by a pencil on the axial line of rotation. A graphical figure thus obtained is the Polhode diagram shown in Fig. 1. This diagram comprises an assembly of curves produced when the spherical body is rotated taking various points on the surface of the spherical body as a point on an initial axis of rotation. As seen from the figure, this diagram has generally three pairs of poles P1Q1, P2Q2 and P3Q3. These pairs of poles intersect always perpendicular to each other and coincide in fact with the three main rectangular axes of inertia having the main moments of inertia Mx, My and Mz, respectively, of the spherical body. Of these three axes, one having a maximum value of main moment of inertia and another having a minimum value of moment of inertia are stable axes, while an axis having an intermediate value is an unstable axis. In Fig. 1, if the spherical body starts to be rotated with its poles P3Q3 as an initial axis of rotation, the body continues to rotate stably in that same condition without inducing any oscillation. Such design is usually most desirable. If the spherical body, however, is rotated with any one point on the sphere deviated from its axis P3Q3 as an initial axis of rotation, the axis of rotation will transfer gradually with respect to the spherical body so that a Polhode diagram will be depicted as shown in the figure. Generally speaking, a Polhode is a curve described on an ellipsoid by the point of contact of a tangent plane that touches at the same time a concentric sphere.

Under these circumstances, when the spherical body is depressed in such a way as pressed slightly with the end of a drill provided slidably on the central axis line of rotation, the rotation axis becomes deviated from the Polhode diagram with respect to the spherical body so as to transfer toward a stable pole. This may be said to be a transfer to the position of minimum energy. By effecting such slight pressing intermittently or continuously, the axis of rotation will coincide within a short time with the stable pole, and thus a centering hole may be pierced by pressing strongly the end of the drill. The same operation may be effected on the other side of the spherical body. Thereafter, when the centering holes on opposite sides are connected, the connecting line is in effect the main axis of inertia of the spherical body. Hence, if the spherical body is rotated with this line as an axis of rotation, no oscillation will be induced in the spherical body regardless of at how high a speed it rotates. The above-described operation can be effected with a high degree of sensibility and rapidity. As an example, in a body having a moment of inertia of 1,000 in gr. cm. per unit, an operation in a few seconds will be sufficient to detect the dynamic unbalance and to correct it. Above is the principle of the present invention.

Now, referring to Fig. 2, one embodiment of the invention will be described briefly. A body 1 to be worked has its rotating shaft 2 extended to opposite sides. A hollow spherical metallic body 3 is constructed so as to be divided into its upper and lower parts. These upper and lower hemispheres are adjustably secured to each other by a supporting member 4. Secured at inner sides of the upper and lower hemi-spherical shells 3 are projections 5 to serve as bearings for the shafts 2. The spherical shell 3 is supported on a bearing 6 of the same diameter.

One modification is shown in Fig. 3, in which the sphere 3 is borne on several balls 21 placed on an annular member 22 which is fixed on a table member 16 rotatably mounted on a frame part 17. A holding plate 23 has a disk-like shape, having a central opening and several holes near somewhat rising peripheries which holes prevent displacement of the balls. The member 16 is rotated by an electric motor 24 through a belt 25. There exists a slight friction between sphere 3 and member 22. Therefore, as the member 16 is rotated by the motor 24, the sphere 3 starts to be rotated about the same axis as the member 16 and the rotation speed is gradually increased. When the speed is sufficiently high, the member 12 is pressed down. As previously explained, this causes the axis of rotation to coincide with the main axis of moment of inertia.

Another modification is shown in Fig. 4, in which the sphere 3 is borne on a rotatable supporting member 18 adapted to be rotated by the motor 24 through the belt 25. The member 18 has several lugs (projections) 19 the upper surfaces of which form the bearing surface for the sphere 3. The friction existing at the contact surfaces is made somewhat larger than in case of Fig. 3. Therefore, the frictional force exerted on the sphere 3 by the rotating member 18 performs the same function as the pressing force by the member 12 shown in Fig. 3. Alternatively, the lug 19 may be formed in a continuous conical shape.

Figure 2:
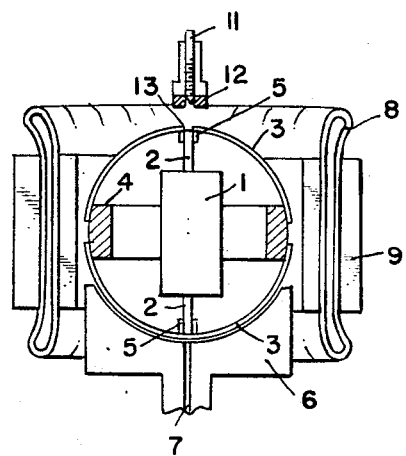
Fig. 2 shows an embodiment of the invention.

Wound on an iron core 9 shown in Fig. 2 surrounding the spherical metallic shell 3 is a three-phase winding 8, to which a three-phase alternating current is supplied, thereby exerting a torque on the spherical metallic shell 3. Alternatively, if the bearing 6 is adapted to be rotated by any means about its vertical central axis, then the electromagnetic devices 8 and 9 may be omitted. In this case, the spherical shell 3 is obviously rotated by the action of a slight friction existing between it and the bearing 6 which is of the same diameter as the shell 3.

Assume that the body to be worked 1 is, in advance, statically balanced, that is, it is regulated so that its center of gravity is positioned on the central line of the rotary shaft 2, and that when it is placed within the spherical shell 3 its center of gravity lies at the center of the spherical shell 3. Under these circumstances, when the spherical shell 3 is rotated, and if the main axis of inertia of the body to be worked 1 does not coincide with the central axis of rotation, then the rotation axis, in the condition of rotation will depict with respect to the spherical shell a Polhode diagram shown in Fig. 1. Now, according to the invention, a drill 11 is pressed down, on the principle described above. Mounted around this drill 11 and slidably thereto is a rubber ring 12 which is pressed, prior to the drill 11, slightly onto the top of the spherical shell 3. This pressing action of the rubber ring is effectively the same as that at its center, and, therefore, the central axis of rotation of the spherical shell will gradually approach to the main axis of inertia. Thereafter, when the rotation of the spherical shell stops by means of suitable clamping pressure the drill 11 is pressed down and forced on the upper end of the shaft 2 through a hole 13 provided on the upper end of the spherical shell 3. Since at an earlier period of the pressing process the central axis of rotation of the spherical shell 3 will coincide completely with the main axis of inertia by drilling into the shaft, a perforation is effected indicating the direction of the main axis of inertia. Time required for these operations is only a few seconds. Further, similar operations are actuated for the opposite end of the shaft 2. For that purpose, the hemi-spherical shells may be separated so that the body to be worked is adapted to be turned upside down. The body to be worked in the above-mentioned operation need not rotate at a very high speed. It may be sufficient, for example, to employ an induction motor having four poles, namely rotating at the rate of 1,500 revolutions per minute. Thus, when the body to be worked 1 is removed from the spherical shell 3 and finished by using the centering holes as the center line, a dynamically balanced body is obtained.

According to the invention, no measuring operation nor trial cut is necessitated, and a dynamic balance is obtained by workshop operations easily and within a short time.

Other variations may be made, of course, in the construction of the instrument without departing from the following claims.

I claim:

1. A dynamic balancing apparatus comprising means for supporting a body which is statically balanced and has a central portion and two oppositely extending axial shafts, a hollow spherical body divided into upper and lower hemi-spherical metallic shells surrounding said body, projections on said hemi-spherical shells serving as guides or bearings for said shafts so that the axis of said shafts and central portion is substantially vertical, a drill mounted substantially vertically above the upper shaft, a supporting member for adjustably securing together the upper and lower hemi-spherical metallic shells, a bearing member having the same diameter as the hollow spherical body for supporting the lower hemi-spherical metallic shell, an iron core surrounding said hemi-spherical shells, a three phase winding wound on said iron core, a three phase alternating current supplied to said winding, thereby exerting a torque to the hemi-spherical metallic shells whereby the vertical axis of rotation of the body to be balanced is caused to coincide with its main axis of inertia when said drill is pressed down and forced on the upper end of said upper shaft.

2. A dynamic balancing apparatus comprising a hollow spherical metallic body divisable into upper and lower hemi-spherical shells for surrounding and securing a work body which is previously statically balanced, and whose center of gravity is at the sphere center, means for bearing the lower hemi-spherical shell so that the spherical body is rotatable universally about its sphere center, means for causing said spherical body to rotate about an axis passing through the sphere center and fixed with respect to the space, means for pressing said spherical body effectively at a point on said fixed axis so that the axis of rotation is caused by the pressing to automatically coincide with its main axis of inertia, and means for nicking the work body at a point on said fixed axis when the axes of rotation and inertia have become coincident.

References Cited in the file of this patent

UNITED STATES PATENTS

| | | |
|---|---|---|
| 1,761,945 | Van Degrift | June 3, 1930 |
| 2,353,150 | Dietz | July 11, 1944 |
| 2,746,299 | Federn et al. | May 22, 1956 |